United States Patent [19]

Sugano

[11] Patent Number: 4,924,979
[45] Date of Patent: May 15, 1990

[54] HYDRAULIC LOCK-UP CONTROL SYSTEM DURING SHIFTING IN AUTOMATIC TRANSMISSION

[75] Inventor: Kazuhiko Sugano, Yokohama, Japan

[73] Assignee: Nissan Motor Co., Ltd., Yokohama, Japan

[21] Appl. No.: 264,740

[22] Filed: Oct. 31, 1988

[30] Foreign Application Priority Data

Oct. 30, 1987 [JP] Japan ................. 62-273216

[51] Int. Cl.$^5$ ............. F16D 25/14; F16D 67/02
[52] U.S. Cl. ................. 192/3.31; 192/3.29; 192/3.3; 192/3.57
[58] Field of Search ........... 192/3.29, 3.3, 3.31, 192/3.57

[56] References Cited

U.S. PATENT DOCUMENTS

| | | | |
|---|---|---|---|
| 3,682,043 | 8/1972 | Bailey et al. | 192/3.57 |
| 4,051,932 | 10/1977 | Arai et al. | 192/3.3 |
| 4,095,486 | 6/1978 | Ohnuma | 192/3.29 |
| 4,562,905 | 1/1986 | Nishimura et al. | 192/3.3 |
| 4,572,338 | 2/1986 | Miki | 192/3.29 |
| 4,595,088 | 6/1986 | Sugano | 192/3.31 |
| 4,607,731 | 8/1986 | Sugano | 192/3.29 |
| 4,665,770 | 5/1987 | Van Selous | 192/0.034 |
| 4,697,474 | 10/1987 | Sumiya et al. | 192/3.31 |
| 4,727,773 | 3/1988 | Sumiya et al. | 192/13 R |
| 4,771,852 | 9/1988 | Nishikawa et al. | 192/3.57 |

Primary Examiner—Rodney H. Bonck
Assistant Examiner—Nicholas Whitelaw
Attorney, Agent, or Firm—Foley & Lardner, Schwartz, Jeffery, Schwaab, Mack, Blumenthal & Evans

[57] ABSTRACT

A low restrictor is provided in a hydraulic line having one end connected to a fourth speed servo apply chamber of a friction device, in the form of a band brake, and an opposite end connected to a 3-4 shift valve. An accumulator is connected to the hydraulic line at a first section between the flow restrictor and the friction device. A lock-up control valve is connected to the hydraulic line at a second section between the flow restrictor and the 3-4 shift valve. The lock-up control valve includes a spool movable to a first position where a lock-up clutch is released from a second position where the lock-up clutch is engaged in response to a drop in hydraulic pressure within the second section of the hydraulic line upon shifting from the fourth speed ratio to the third speed ratio. Since the transmission of this drop to the first section of the hydraulic line is delayed by the flow restrictor and the accumulator, the release of the friction device is delayed.

2 Claims, 5 Drawing Sheets

FIG. 3

| | | R/C | H/C | F/C | O/C | B/B 2A | B/B 3R | B/B 4A | L&R/B | F/O | L/O | GEAR RATIO | $\alpha_1 = 0.45$, $\alpha_2 = 0.45$ |
|---|---|---|---|---|---|---|---|---|---|---|---|---|---|
| D RANGE | ENGINE DRIVING | 1 ST | | | ○ | | | | | | ○ | ○ | $\dfrac{1+\alpha_1}{\alpha_1}$ | 3.22 |
| | | 2 ND | | | ○ | | | ○ | | | ○ | | $\dfrac{\alpha_1+\alpha_2+\alpha_1\alpha_2}{\alpha_1(1+\alpha_2)}$ | 1.69 |
| | | 3 RD | | ○ | ○ | ○ | | | | | ○ | | 1 | 1 |
| | | 4 TH | | ○ | (○) | ○ | | | ○ | | | | $\dfrac{1}{1+\alpha_2}$ | 0.69 |
| | ENGINE BRAKING | 1 ST | | | (○) | | ○ | ○ | | | | | | |
| | | 2 ND | | | (○) | | ○ | ○ | | | | | | |
| | | 3 RD | | ○ | (○) | ○ | ○ | ○ | | | | | | |
| | | 4 TH | | ○ | (○) | ○ | | | ○ | | | | | |
| 2 ND RANGE | | 1 ST | | | ○ | | ○ | | | | ○ | ○ | | |
| | | 2 ND | | | ○ | | | | | | ○ | | | |
| 1 ST RANGE | | 1 ST | | | ○ | | | | | ○ | ○ | | | |
| REVERSE | | | ○ | | | | | | | ○ | | | $-\dfrac{1}{\alpha_2}$ | -2.22 |

( ) UNRELATED TO POWER TRANSMISSION

HYDRAULIC LOCK-UP CONTROL SYSTEM DURING SHIFTING IN AUTOMATIC TRANSMISSION

BACKGROUND OF THE INVENTION

The present invention relates to a hydraulic control system for an automatic transmission, and more particularly to a hydraulic lock-up control system during a shift taking place in an automatic transmission.

A known hydraulic lock-up control system for an automatic transmission is illustrated on page 33 of a publication entitled "TOYOTA VISTA E-SV10 SERIES A/T MOUNTED CAR, NEW CAR INTRODUCTION MANUAL, JULY 1982." In this known hydraulic system, a lock-up control valve causes a lock-up clutch to be engaged during operation with the fourth speed ratio. The lock-up control valve is shiftable between two positions where the lock-up clutch is caused to be engaged and released, respectively, in response to a hydraulic pressure building up in a servo chamber of a brake to be engaged upon shifting up to the fourth speed ratio and released upon shifting from the fourth speed ratio down to the third speed ratio. More specifically, a lock-up engagement port of the lock-up control valve, namely, a port which, when supplied with a hydraulic pressure, causes a spool of the lock-up control valve to take the position where the lock-up clutch is caused to be engaged, is connected to a hydraulic line through which hydraulic fluid is supplied from a 3-4 shift valve to the servo apply chamber of the above-mentioned fourth speed brake. The hydraulic line is provided with flow restrictor, and the lock-up control valve is connected to the hydraulic line at a section thereof between the servo chamber and the flow restrictor. According to this arrangement, the lock-up clutch is engaged upon shifting from the third speed ratio to the the fourth speed ratio (a 3-4 upshift), and the lock-up clutch released upon shifting from the fourth speed ratio to the third speed ratio (a 4-3 downshift).

This known hydraulic lock-up control system, however, poses a problem that there occurs substantial shock during the 4-3 downshift. This is because the release action of the above-mentioned brake and the release action of the lock-up clutch take place at the same time during the 4-3 downshift, and thus shocks taking place upon release of the brake and shocks taking place upon release of the lock-up clutch are superimposed.

An object of the present invention is to provide a hydraulic control system which is improved such that shocks taking place upon shifting from a n th speed ratio down to a n−1 th speed ratio (where: n is an integer) and upon release of a lock-up device are not superimposed.

SUMMARY OF THE INVENTION

According to the present invention, there is provided a hydraulic control system for an automatic transmission having a friction device including a chamber which is adapted to be supplied with hydraulic fluid when the automatic transmission shifts up to a n th speed ratio, where: n is an integer, and a torque converter with a lock-up device, the hydraulic control system comprising:

a lock-up control valve including a spool with a pressure acting area, the spool having a first position where the lock-up device is caused to be released and a second position where the lock-up device is caused to be engaged. Also, means for biasing said spool of said lock-up control valve to said first position thereof, and means defining a hydraulic line having one end communicating with the chamber of the friction device and having an opposite end communicating with a shift valve.

Shift valve means connected to the opposite end of the hydraulic line for allowing supply of hydraulic fluid to the opposite end of the hydraulic line upon shifting up to the n th speed ratio and discharge of hydraulic fluid from said opposite end of said hydraulic line upon shifting down from the n th speed ratio.

Flow restrictor means provided in the hydraulic line dividing the hydraulic line into a first section on one side thereof near the chamber of the friction device and a second section on the opposite side thereof. In addition, means for transmitting a hydraulic pressure building up in the second section of the hydraulic line to the lock up control valve to have the hydraulic pressure to act on the pressure acting area of the spool in such a direction as to urge the spool against the biasing means referenced above; and accumulator means connected to the first section of the hydraulic line.

BRIEF DESCRIPTION OF THE DRAWINGS

FIG. 3 is a table showing a shift schedule of the automatic transmission;

DETAILED DESCRIPTION OF THE INVENTION

Figure 2:
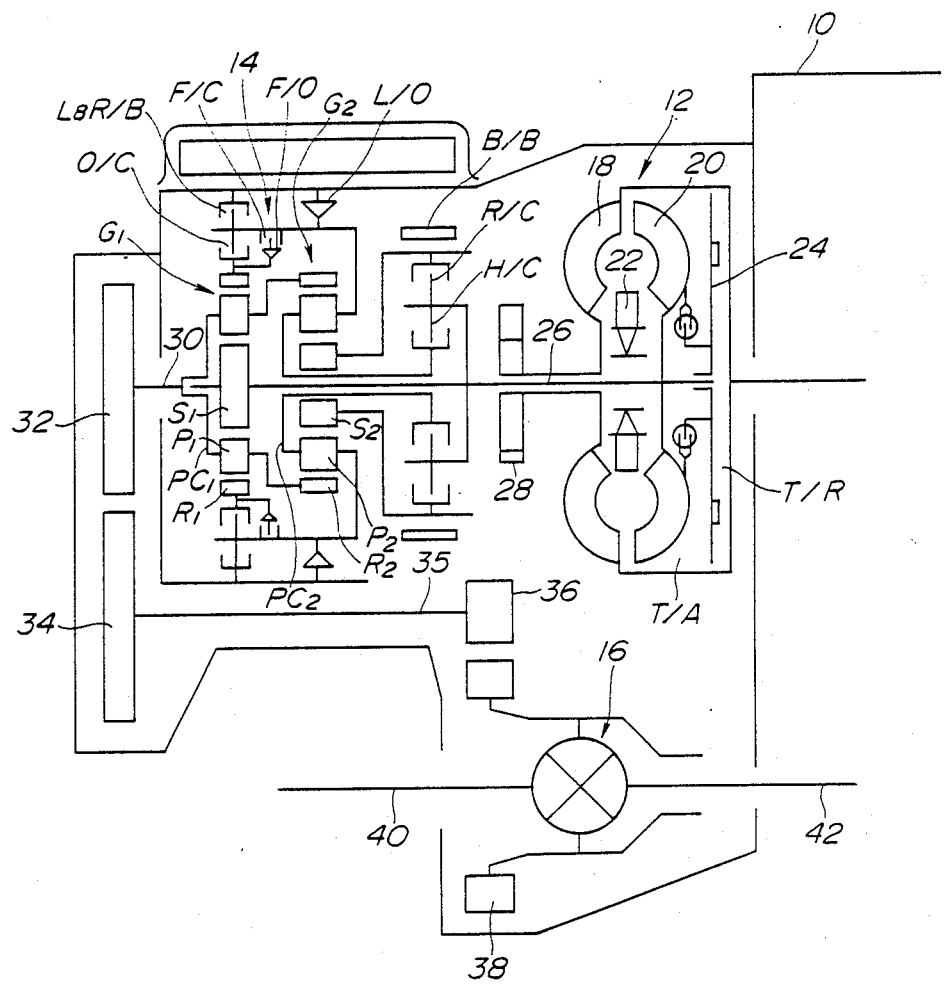
FIG. 2 is a line diagram of a power train of a transaxle including the automatic transmission.

Referring to FIG. 2, there is shown a line diagram of an automatic transmission (automatic transaxle). That is, reference numeral 10 designates an engine which is suitable for transverse mount with regard to the longitudinal direction of a vehicle. Torque of the engine is supplied to a torque converter 12 on a pump impeller 18 thereof. In addition to the torque converter 12, the automatic transmission comprises a change speed planetary gear box 14, and a differential unit 16. In addition to the pump impeller 18, the torque converter 12 includes a turbine runner 20 and a stator 22. It also includes a lock-up clutch 24 for establishing a mechanical drive connection between the pump impeller 18 and turbine runner 20. When the lock up clutch 24 is disengaged or released, torque is transmitted via hydraulic fluid from the pump impeller 18 to the turbine runner 20 and then to a transmission input shaft 26 drivingly connected to the turbine runner 20. When the lock-up clutch 24 is engaged, the torque is transmitted via a mechanical connection between the pump impeller 18 and turbine runner 20 to the input shaft 26. The lock-up clutch 24 is activated in response to a pressure differential between an apply chamber T/A and a release chamber T/R. The pump impeller 18 is drivingly connected to an oil pump 28 so that the engine drives the oil pump 28.

The change speed planetary gear box 14 comprises a first planetary gear set $G_1$ and a second planetary gear set $G_2$. The first planetary gear set $G_1$ includes a first sun gear $S_1$, a first internal or ring gear $R_1$, and a first planet pinion carrier $PC_1$. The first planet pinion carrier $PC_1$ rotatably supports at least one planet pinion $P_1$ meshing with the sun and ring gears $S_1$ and $R_1$. The second planetary gear set $G_2$ comprises a second sun gear $S_2$, a second internal or ring gear $R_2$, and a second planet pinion carrier $PC_2$. The second planet pinion carrier $PC_2$ rotatably supports at least one planet pinion $P_2$ meshing with the second sun and ring gears $S_2$ and $R_2$. The first sun gear $S_1$ is drivingly connected to the input shaft 26, while the first pinion carrier $PC_1$ and second ring gear $R_2$ are drivingly connected to a transmission output shaft 30.

Via a serially connected forward one-way clutch F/O and forward clutch F/C, the first ring gear $R_1$ is drivingly connectable to the second pinion carrier $PC_2$. An overrunning clutch O/C is arranged in parallel to the serially connected forward one-way clutch F/O and forward clutch F/C. Via this overrunning clutch O/C, the first ring gear $R_1$ is drivingly connectable to the second pinion carrier $PC_2$. The second sun gear $S_2$ is drivingly connectable via a reverse clutch R/C to the input shaft 26. The second pinion carrier $PC_2$ is drivingly connectable via a high clutch H/C to the input shaft 26. The second sun gear $S_2$ is adapted to be held stationary relative to a transmission casing via a band brake B/B. The second pinion carrier $PC_2$ is adapted to be held stationary relative to the casing via a low one-way clutch L/O or a low & reverse brake L&R/B which is arranged in parallel to the low one-way clutch L/O. The output shaft 30 has an output gear 32 rotatable therewith. An idler shaft 35 is rotatably mounted in the transmission casing and extends in parallel to the output shaft 30. An idler gear 34 is connected to the idler shaft 35 for rotation therewith at one end portion thereof. At the opposite end portion, the idler shaft 35 has a reduction gear 36 for rotation therewith. The idler gear 34 is in mesh with the output gear 32, while the reduction gear 36 in mesh with a ring gear 38 of the differential unit 16. The differential unit 16 has drive axles 40 and 42 extending outward in the opposite directions. These drive axles 40 and 42 are drivingly connected to a left front wheel and a right front wheel, respectively.

In the change speed planetary gear box 14, varying a selected one or a selected combination of the clutches F/C, H/C, O/C, and R/C, the brakes B/B and L&R/B, and the one-way clutches F/O and L/O which are to be activated or engaged will cause a shift in rotating state of planetary gear elements $S_1$, $S_2$, $R_1$, $R_2$, $PC_1$, and $PC_2$ of the planetary gear sets $G_1$ and $G_2$, causing a change in the rotational speed of the output shaft 30 relative to the rotational speed of the input shaft 26. More specifically, activating one of or a combination of the clutches, brakes, and one-way clutches in a schedule as illustrated in the TABLE in FIG. 3 will cause a shift between four forward speed ratios in various modes and a reverse speed ratio. In FIG. 3, the sign o indicates that a particular frictional device is activated or engaged. If the particular friction device is a clutch or a brake, the above-mentioned sign o indicates the engagement of the clutch or brake, while if the particular friction device is a one-way clutch, the sign o indicates activation of the one-way clutch. The reference numerals 2A, 3R, and 4A arranged in a row below the reference numeral B/B indicate a second speed apply chamber 2A, a third speed release chamber 3R and a fourth speed apply chamber 4A of a hydraulic pressure operated servomotor for tightening the band brake B/B. The reference sign o indicates supply of hydraulic fluid pressure to a particular chamber. The reference characters $\alpha_1$ (alpha one) and $\alpha_2$ (alpha two) express a ratio of number of teeth of the sun gear $S_1$ to number of teeth of the ring gear $R_1$, and a ratio of number of teeth of the sun gear $S_2$ to number of teeth of the ring gear $R_2$, respectively. A gear ratio is a ratio of rotational speed of the input shaft 26 to rotational speed of the output shaft 30.

Owing to the change speed operation by the planetary gear box 14, rotating the input shaft 26 at a rotational speed causes the output shaft 30 to rotate at a rotational speed decreased or increased from the rotational speed of the input shaft 26. Torque of the output shaft 30 is transmitted via an output gear 32, idler gear 34, reduction gear 36 to the ring gear 38 of the differential unit 16. This causes the drive axles 40 and 42 to drive the left and right front wheels 40 and 42. As a result, an automatic shift among four forward speed ratios including an overdrive can be effected.

Figure 4:
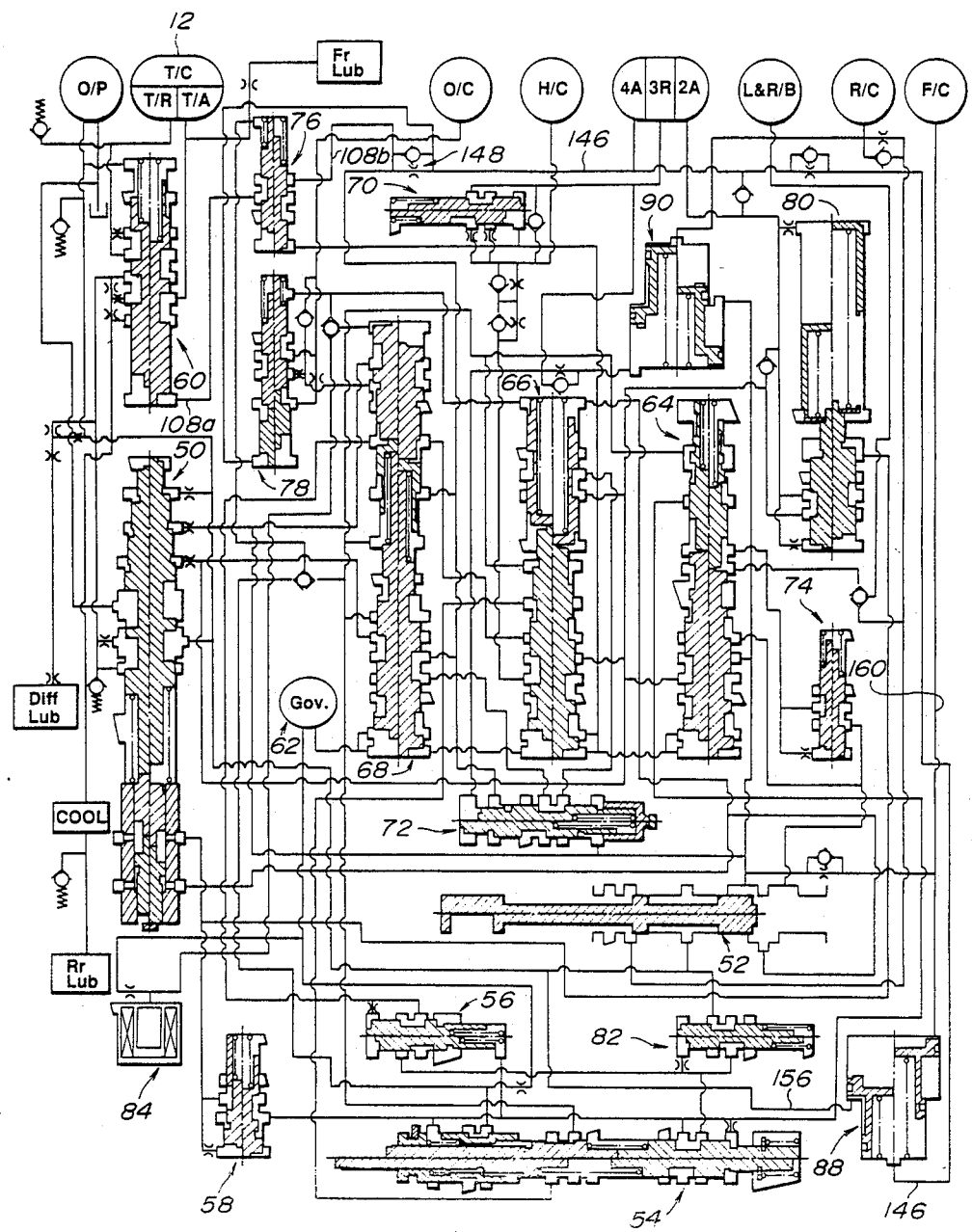
FIG. 4 is a hydraulic circuit of the hydraulic control system for the automatic transmission.

FIG. 4 shows a hydraulic circuit of a hydraulic control system for controlling the above-mentioned power train.

This hydraulic control system comprises the following valves: a pressure regulator valve 50, a manual valve 52, a throttle valve 54, a throttle modifier valve 56, a pressure modifier valve 58, a lock-up control valve 60, a governor valve 62, a 1-2 shift valve 64, a 2-3 shift valve 66, a 3-4 shift valve 68, a 3-2 timing valve 70, a 4-2 sequence valve 72, a manual first range pressure reduction valve 74, a vehicle speed cutoff valve 76, an overrunning clutch control valve 78, a 1-2 accumulator valve 80, a kickdown modifier valve 82, an overdrive inhibitor solenoid 84, a N-D accumulator 88, and a servo release accumulator 90. These valves are operatively interconnected as illustrated in FIG. 4. They are connected also to an oil pump O/P, the apply chamber T/A and the release chamber T/R of the torque converter 12, the clutches R/C, H/C, O/C, and F/C, the brake L&R/B, and three chambers 2A, 3R, and 4A of the band brake B/B as illustrated in FIG. 4. Owing to this circuit structure, the appropriate one or the appropriate combination of the clutches R/C, H/C, O/C, and F/C, and the brakes L&R/B and B/B which are to be engaged is selected in response to vehicle speed and opening degree of the engine throttle. In this disclosure, such valves which are not directly concerned with the present invention are not specifically described. The following explanation proceeds along FIG. 1 which illustrates such valves and portions, extracted from the whole system, which have close connection with the present invention in order to make it easy to understand the present invention.

Figure 1:
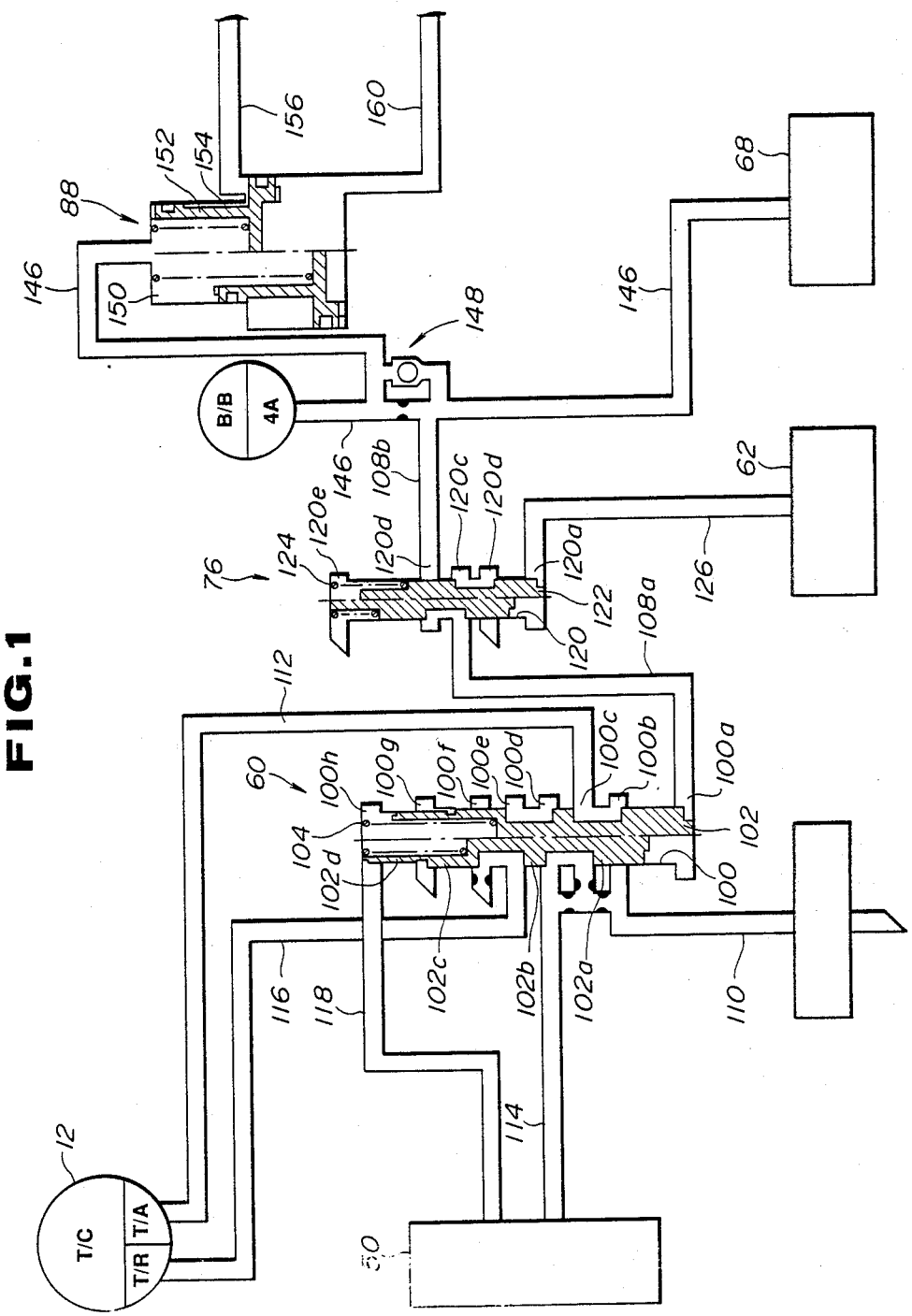
FIG. 1 is a circuit depicting a portion of a hydraulic control system for an automatic transmission showing a preferred embodiment according to the present invention.

As shown in FIG. 1, the lock-up control valve 60 comprises a spool 102 slidably inserted into a valve bore 100 and a spring 104 biasing the spool 102 down as viewed in FIG. 1. The valve bore 100 is provided with various ports 100a to 100h. The spool 102 has various lands 102a to 102d. Among them, the lands 102a, 102b, and 102c have the same diameter, while land 102d has a diameter reduced than the above-mentioned three lands. The relationship, in position, of various lands and ports is set as illustrated. The port 100a is connected to a hydraulic line 108a communicating with a port 120c of the vehicle speed cutoff valve 76. The port 100b is connected to a hydraulic line 110 provided for lubrication. The port 100c is connected to a hydraulic line 112 communicating with the apply chamber T/A within the torque converter 12. The port 100d is connected to a hydraulic line 114 which is supplied with a torque converter supply pressure from the pressure regulator valve 50. The port 100e is connected to a hydraulic line 116 which is connected to the release chamber T/R within the torque converter 12. In order to allow flow of hydraulic fluid to the hydraulic line 110 to assure lubrication even during engagement of the lock-up clutch 24, the hydraulic line 112 is connected via the port 100c and orifices to the hydraulic line 110, while the hydraulic line 114 is connected via orifices to the hydraulic line 110. The ports 100f and 100g are drain ports, respectively. The port 100h is connected to a hydraulic line 118 which is supplied with a line pressure from the pressure regulator valve 50. The relationship between a pressure acting area formed on the land 102a, a pressure acting area formed on the land 102d, and a bias force of a spring 104 is as follows. That is, when the port 100a is supplied with the line pressure, the spool 102 is shifted to a position as indicated by a left half thereof as illustrated in FIG. 1 (or an engagement side position). However, the spool 102 is otherwise held to a position as indicated by a right half thereof as illustrated in FIG. 1 (or a release side position).

The speed cutoff valve 76 comprises a spool 122 slidably inserted into a valve bore 120, and a spring 124 biasing the spool 122 down as viewed in FIG. 1. The valve bore 120 is provided with ports 120a to 120e. The port 120a is connected to a hydraulic line 126 supplied with the governor pressure from the governor valve 62. The port 120b is a drain port. The port 120c is connected to the hydraulic line 108a. The port 120d is connected via a hydraulic line 108b to a hydraulic line 146 having one end connecected to the 2-3 shift valve 68 and an opposite end connected to the apply chamber 4A, i.e., the apply chamber to be pressurized during operation with the fourth speed ratio, of the band brake B/B. More particularly, a one-way flow restrictor 148 is provided in the hydraulic line 146 which allows unrestricted flow of hydraulic fluid during the supply of hydraulic fluid to the apply chamber 4A from the 2-'-shift valve 68, whereas the flow of hydraulic fluid is restricted during the discharge of hydraulic fluid from the release chamber 4A. This one-way flow restrictor 148 divides the hydraulic line 146 into a first section on the side thereof near the release chamber 4A and a second section on the opposite side thereof near the 2-'shift valve 68. The port 120d is connected to the second section of the hydraulic line 146, since it is necessary to transmit a change in hydraulic pressure building up in the second section of the hydraulic line 146 to the port 100a of the lock-up control valve 60 via the hydraulic line 108b, the vehicle speed cutoff valve 76, and the hydraulic line 108a. The port 120e is a drain port. The spool 122 has two lands 122a and 122b of the same diameter. The relationship between the various ports and lands is set as illustrated in FIG. 1.

The first section of the hydraulic line 146 communicates with a variable volume chamber 150 of the N-D accumulator 88. The N-D accumulator 88 includes a stepped piston 152 with a reduced diameter section extending from a relatively large diameter section. The reduced diameter section defines the above-mentioned chamber 150. There is defined a chamber 154 between the reduced and large diameter sections. The line pressure is always supplied to this chamber 154 via a hydraulic line 156. The large diameter section defines a chamber 158 which a hydraulic line 160 communicates with. This hydraulic line 160 has one end connected to the manual valve 52 and an opposite end connected to a servo chamber of the forward clutch F/C. Thus, when the vehicle travels forward, the hydraulic pressure is always supplied to the chamber defined by the large diameter section of the stepped piston 152. It will be readily understood that owing to the provision of the one-way flow restrictor 148, there occurs no restriction influenced on the flow of hydraulic fluid toward the accumulator chamber 150 and the apply chamber 4A, whereas the discharge flow of hydraulic fluid from the apply chamber 4A and accumulator chamber 150 is restricted.

The operation of this embodiment is described.

There is no supply of hydraulic fluid to the hydraulic line 108b during operation with the third speed ratio. Thus, no hydraulic pressure is supplied to the hydraulic line 146 and then to the apply chamber 4A. Since there is no hydraulic pressure build up in the hydraulic line 146, no hydraulic pressure is supplied to the port 100a of the lock up control valve 60 regardless of which of the positions the vehicle speed cutoff valve 76 takes. Therefore, the automatic transmission stays in the third speed ratio, the spool 102 of the lock-up control valve 60 stays in the release side position as indicated by the right half thereof as viewed in FIG. 1, allowing the hydraulic line 114 to communicate with the hydraulic line 116 and the hydraulic line 112 to communicate with the hydraulic line 110. This causes hydraulic fluid to be supplied to the release chamber T/R of the torque converter 12, and hydraulic fluid to be discharged from the apply chamber T/A. This results in release of the lock-up clutch 24. Therefore, the lock-up clutch 24 is always released during operation with the third speed ratio.

When the 3-4 shift valve 68 is ushifted to initiate supply of hydraulic fluid to the hydraulic line 146, the hydraulic fluid be9ins to be supplied toward the apply chamber 4A and to the chamber 150 of the accumulator 88. The one-way flow restrictor 148 does not influence any flow restriction on the supply of hydraulic fluid to the apply chamber 4A and the chamber 150 of the accumulator 88. Thus, the automatic transmission undergoes shifting from the third speed ratio to the fourth speed ratio. When the vehicle speed is above the predetermined value, the governor pressure causes the spool 122 of the vehicle speed cutoff valve 76 to take the position as indicated by the right half thereof as viewed in FIG. 1, allowing the hydraulic line 108b to communicate with the hydraulic line 108a, allowing the transmission of the hydraulic pressure within the second section of the hydraulic line 146 to the port 100a of the lock-up control valve 60. This causes the spool 102 of the lock-up control valve 60 to take the engagement side position as indicated by the left half thereof as viewed in FIG. 1, allowing the hydraulic line 114 to communicate with the hydraulic line 112, and the hydraulic line 116 to communicate with the drain port 100f. Under this condition, the hydraulic fluid is supplied to the apply chamber T/A of the torque converter 12, while the release chamber T/R is drained. This results in engagement of the lock-up clutch 24. Therefore, the lock-up clutch 24 is engaged during operation with the fourth speed ratio when the vehicle speed is above the predetermined value.

Subsequently, when the 3-4 shift valve 68 is downshifted to the position for the third speed ratio, the discharge of hydraulic fluid from the chamber 4A is initiated by draining the hydraulic line 146. Assuming that the spool 122 of the vehicle speed cutoff valve 76 remains in the position as indicated by the left half thereof as viewed in FIG. 1, the hydraulic pressure within the hydraulic lines 108a, 108b and the second section of the hydraulic line 146 drops immediately. Thus, the lock-up clutch 24 is released immediately. However, owing to the flow restriction by the one-way flow restrictor 148 and the discharge of hydraulic fluid from the chamber 150 to the first section of the hydraulic line 146 during the stroke of the accumulator piston 152, the level of the hydraulic fluid pressure within the apply chamber 4A remains high during the stroke of the accumulator piston 152. Thus, during this time periord, the band brake B/B is left engaged. After completion of the stroke of the accumulator piston 152, the hydraulic pressure within the apply chamber 4A drops at a fast rate, and thus the band brake B/B is released, causing the shift to take place. Thus, the 4-3 shift takes place upon elapse of a predetermined period of time after the instance when the 3-4 shift valve 68 has shifted.

As will now be understood, the release of the lock-up clutch 24 takes place immediately after the instance when the 3-4 shift valve 68 has shifted, and upon elapse of the predetermined period of time determined by the stroke of the accumulator piston 152, the 4-3 shift is initiated by the release of the band brake B/B.

Figure 5A:
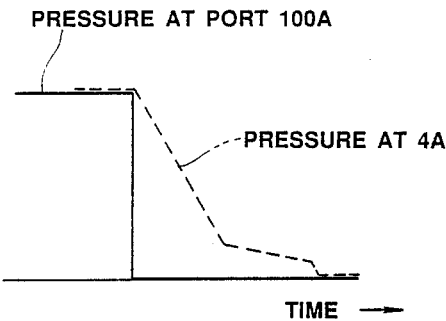
FIGS. 5(a), 5(b), 5(c) timing diagrams of variations of hydraulic pressures during a 4-3 downshift.
Figure 5B:
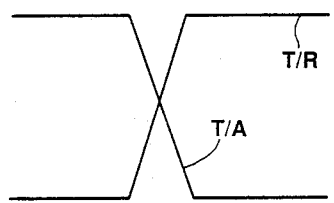
Figure 5C:
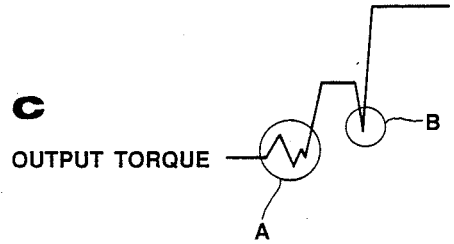

FIGS. 5(a). 5(b), and 5(c) illustrates variations of hydraulic pressures during the 4-3 shift. As shown in FIG. 5(a), the pressure at the port 100a of the lock-up control valve 60 drops immediately, whereas the pressure at the apply chamber 4A of the band brake B/B drops at a gradual rate and thus remains high till elapse of the predetermined period of time. Referring to FIG. 5(b), the pressure at the apply chamber T/A of the torque converter 12 drops, while the pressure at the release chamber T/R of the torque converter 12 increases. FIG. 5(c) shows the variation of output shaft torque. Torque down encircled by the circle A are caused by the release of the lock-up clutch 24, while torque down encircled by the circle B is caused by the release of the band brake B/B. Srnce these torque changes are not superimposed, the shocks during the 4-3 downshift have been suppresssed to a sufficiently low level.

What is claimed is:

1. In a hydraulic control system for an automatic transmission having a friction device including a chamber which is adapted to be supplied with hydraulic fluid when the automatic transission shifts up to a n th speed ratio, where: n is an integer, and a torque converter with a lock-up device:

a lock-up control valve including a spool with a pressure acting area, said spool having a first position where the lock-up device is caused to be released and a second position where the lock-up device is caused to be engaged;

means for biasing said spool of said lock-up control valve to said first position thereof;

means defining a hydraulic line having one end communicating with the chamber of the friction device and an opposite end;

shift valve means connected to said opposite end of said hydraulic line for allowing supply of hydraulic fluid to said opposite end of said hydraulic line upon shifting up to the n th speed ratio and discharge of hydraulic fliud from said opposite end of said hydraulic line upon shifting down from the n th speed ratio;

flow restrictor means provided in said hydraulic line dividing said hydraulic line into a first section on one side thereof near the chamber of the friction device and a second section on the opposite side thereof;

means for transmitting a hydraulic pressure building up solely in said second section of said hydraulic line to said lock-up control valve to have said hydraulic pressure to act on said pressure acting area of said spool in such a direction as to urge said spool against said biasing means;

accumulator means connected to said first section of said hydraulic line.

2. A hydraulic control system as claimed in claim 1, wherein said hydraulic pressure transmitting means include means for generating a vehicle speed, and a vehicle speed cutoff valve fluidly disposed between said second section of said hydraulic line and said lock-up control valve, said vehicle speed cutoff valve including spool means responsive to said vehicle speed indicative hydraulic pressure for cutting off the transmission of said hydraulic pressure to said lock-up control valve.

* * * * *